(12) United States Patent
Shroff et al.

(10) Patent No.: US 11,106,027 B2
(45) Date of Patent: *Aug. 31, 2021

(54) RESOLUTION ENHANCEMENT FOR LINE SCANNING EXCITATION MICROSCOPY SYSTEMS AND METHODS

(71) Applicant: THE UNITED STATES OF AMERICA, as represented by the Secretary, Department of Health and Human Services, Bethesda, MD (US)

(72) Inventors: Hari Shroff, Bethesda, MD (US);
Andrew York, Bethesda, MD (US);
John Giannini, Bethesda, MD (US);
Abhishek Kumar, Bethesda, MD (US)

(73) Assignee: THE UNITED STATES OF AMERICA, AS REPRESENTED BY THE SECRETARY, DEPARTMENT OF HEALTH AND HUMAN SERVICES, Bethesda, MD (US)

(*) Notice: Subject to any disclaimer, the term of this patent is extended or adjusted under 35 U.S.C. 154(b) by 151 days.

This patent is subject to a terminal disclaimer.

(21) Appl. No.: 16/371,641

(22) Filed: Apr. 1, 2019

(65) Prior Publication Data
US 2019/0227292 A1 Jul. 25, 2019

Related U.S. Application Data

(63) Continuation of application No. 15/512,870, filed as application No. PCT/US2015/051422 on Sep. 22, 2015, now Pat. No. 10,247,930.

(60) Provisional application No. 62/054,481, filed on Sep. 24, 2014.

(51) Int. Cl.
*G02B 21/00* (2006.01)
*G02B 27/58* (2006.01)
*G02B 26/10* (2006.01)

(52) U.S. Cl.
CPC ..... *G02B 21/0076* (2013.01); *G02B 21/0032* (2013.01); *G02B 21/0036* (2013.01); *G02B 21/0048* (2013.01); *G02B 26/101* (2013.01); *G02B 27/58* (2013.01)

(58) Field of Classification Search
CPC .................................................. G02B 21/0076
See application file for complete search history.

(56) References Cited

U.S. PATENT DOCUMENTS

| | | | | |
|---|---|---|---|---|
| 5,283,433 A * | 2/1994 | Tsien | ................ | G02B 21/008 250/234 |
| 5,370,643 A * | 12/1994 | Krivoshlykov | ........ | A61B 18/22 606/16 |
| 6,621,628 B1 * | 9/2003 | Ogino | ................ | G02B 21/0024 250/201.1 |
| 9,075,227 B2 * | 7/2015 | Rachet | ................ | G03F 7/70191 |
| 9,696,534 B2 * | 7/2017 | Shroff | ................ | G01N 21/6458 |

(Continued)

*Primary Examiner* — John W Miller
*Assistant Examiner* — Justin B Sanders
(74) *Attorney, Agent, or Firm* — McCoy Russell LLP

(57) ABSTRACT

A resolution enhancement technique for a line scanning confocal microscopy system that generates vertical and horizontal line scanning patterns onto a sample is disclosed. The line scanning confocal microscopy system is capable of producing line scanning patterns through the use of two alternative pathways that generate either the vertical line scanning pattern or horizontal line scanning pattern.

20 Claims, 7 Drawing Sheets

(56) References Cited

U.S. PATENT DOCUMENTS

| | | | |
|---|---|---|---|
| 2006/0012855 A1* | 1/2006 | Wolleschensky | G02B 21/0032 359/368 |
| 2011/0300490 A1* | 12/2011 | Rachet | G03F 7/70191 430/322 |
| 2014/0126046 A1* | 5/2014 | Shroff | G02B 21/0004 359/385 |
| 2015/0192461 A1* | 7/2015 | Chen | G01J 1/0403 356/366 |
| 2016/0139394 A1* | 5/2016 | Taniguchi | G02B 21/10 359/385 |
| 2016/0238827 A1* | 8/2016 | Shroff | G02B 21/0036 |

* cited by examiner

RESOLUTION ENHANCEMENT FOR LINE SCANNING EXCITATION MICROSCOPY SYSTEMS AND METHODS

CROSS REFERENCE TO RELATED APPLICATIONS

This is a continuation application that claims benefit to U.S. non-provisional application Ser. No. 15/512,870 filed on Mar. 21, 2017, which is a 371 national stage application of PCT patent application serial no. PCT/US2015/051422, filed on Sep. 22, 2015, which claims benefit from U.S. provisional application Ser. No. 62/054,481, filed on Sep. 24, 2014, which are herein incorporated by reference.

GOVERNMENT INTEREST STATEMENT

The present subject matter was made with U.S. government support. The U.S. government has certain rights in this subject matter.

FIELD

This document relates to methods and systems related to structured illumination microscopy, and in particular, to resolution enhancement techniques for line scanning excitation microscopy systems and methods.

BACKGROUND

Classical fluorescence microscopy is limited in resolution by the wavelength of light, referred to as the "diffraction limit", which restricts lateral resolution to about 200 nm and axial resolution to about 500 nm at typical excitation and emission wavelengths when a sample emits fluorescence that is detected by the microscope. Confocal microscopy is an optical imaging technique used to increase optical resolution beyond the diffraction limit by using point illumination and a spatial pinhole arrangement to eliminate out-of-focus emission light from specimens that are thicker than that of the focal plane, thereby delivering images with 1.41 times the resolution than the diffraction limit by a method that requires tightly closing the pinhole. Unfortunately, closing the pinhole diminishes the signal level of the emitted light from the sample to such an extent as to make this particular method of super-resolution impractical. In addition, a confocal microscope must perfectly align the excitation from the microscope's illumination beam with the pinhole/detector, since a misaligned pinhole results in a reduced and weak light signal being detected as well as resulting in reduced axial optical sectioning of the sample itself. As such, misalignment of the confocal microscope can cause a reduction in the light signal.

A method for resolution enhancement for confocal microscopy has been found that uses an array of detectors, such as pixels in a camera image, wherein each of the detectors in the array produces a separate confocal image. If the array of detectors is sufficiently small, each of the formed confocal images can be equivalent to similar confocal images formed by a confocal microscope with a tightly closed pinhole such that 1.41 times the resolution of the diffraction-limited microscope is achieved when the confocal images are properly aligned. In addition, deconvolution provides a further increase in image resolution. However, this detector array arrangement is limited since only a single excitation point is scanned throughout a two-dimensional plane of the sample, which limits the speed the sample can be scanned and subsequent detection of the fluorescence emissions of the sample.

Another type of microscopy, referred to as structured illumination microscopy (SIM), illuminates a sample with spatially modulated excitation intensity, which is translated and rotated in different positions relative to the sample, with a wide-field image being taken at each translation and rotation. Processing the raw images appropriately results in a final image having double the lateral resolution of conventional wide-field microscopy. Although such SIM systems generate images with 2× the spatial resolution of a conventional microscope, there is still a sacrifice in temporal resolution when producing the final image, as time is required to acquire each of the multiple raw images. SIM may also be used to reject out-of-focus blur, known as "optical sectioning". However, such optical-sectioning is performed computationally, and is thus subject to shot (Poisson) noise. SIM is thus inappropriate for thick or highly stained samples, when background fluorescence may cause this shot noise contribution to overwhelm the in-focus signal.

Yet another type of type of microscopy is based on fluorescence microscopes that use line-based illumination, for example line-scanning confocal microscope systems, in which an excitation line is scanned across a sample while capturing the fluorescence on an area detector. Since acquisition is massively parallelized compared to point-scanning techniques, line-scanning techniques offer much higher speed, at the cost of reduced optical sectioning. As such, improvements in resolution enhancement are desired for various types of line-scanning microscopy systems and methods.

BRIEF DESCRIPTION OF THE DRAWINGS

Corresponding reference characters indicate corresponding elements among the view of the drawings. The headings used in the figures should not be interpreted to limit the scope of the claims.

DETAILED DESCRIPTION

Figure 1:
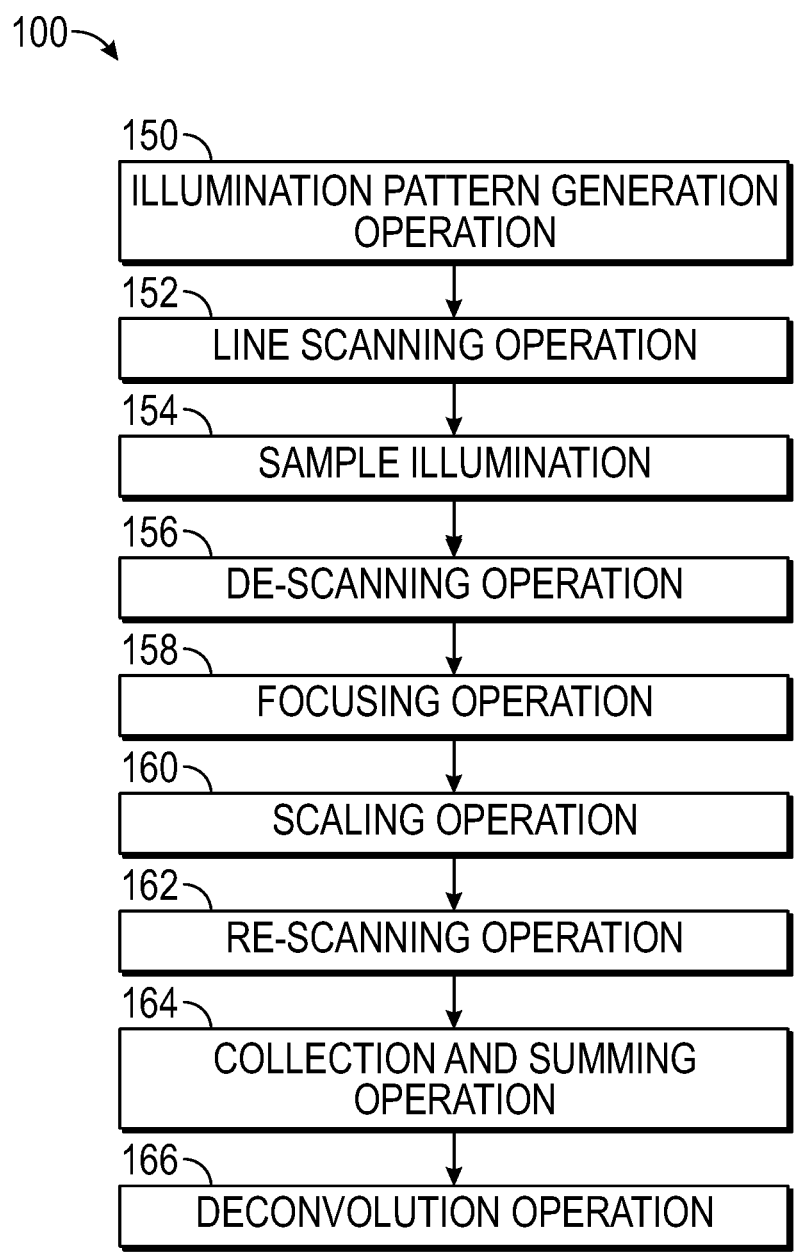
FIG. 1 is a simplified block diagram illustrating one method of resolution enhancement for line-scanning microscopy systems.

Referring to the drawings, various embodiments of a line scanning microscopy system utilizing a resolution enhancement technique are illustrated and generally indicated as 100, 200 and 300 in FIGS. 1-6. As illustrated in FIG. 1, a simplified block diagram illustrates one method for applying a resolution enhancement technique to images captured from, for example, the line-scanning confocal microscopy system, designated 100, which provides a means for generating line-scanning patterns of an illuminated sample 134 (FIG. 2) in which the captured images have enhanced resolution over conventional techniques. In one embodiment of the resolution enhancement technique shown in FIGS. 1, 3A, and 4A, line-scanning confocal microscopy system 100 performs an illumination pattern generation operation 150, which generates one or more vertical line scans 172 or horizontal line scans 182 across the sample 134 being illuminated to form a respective vertical line scanning pattern 170 or a horizontal line pattern 180. As such, when the vertical line scanning pattern 170 is not being generated, the illumination pattern generation operation 150 may alternatively generate one or more horizontal line scans 182 across the sample 134 being illuminated to form the horizontal line scanning pattern 180 shown in FIG. 4A such that the sample 134 is illuminated in both the vertical and horizontal orientations to form respective vertical and horizontal line scanning patterns 170 and 180.

In a line-scanning operation 152, one or more light beams generate one or more vertical line scans 172 or horizontal line scans 180 that form a respective vertical line scanning pattern 170 or horizontal line scanning pattern 180 that is rastered across the sample 134 (FIG. 2) being illuminated such that the sample 134 emits one or more fluorescent emissions generated from each vertical or horizontal line scan 172 and 182 during sample illumination 154. The one or more fluorescent emissions emitted by the sample 134 are rastered in a de-scanning operation 156 which redirects the plurality of fluorescent line scan emissions for removal of out-of-focus fluorescent emissions in a focusing operation 158. In the focusing operation 158, out-of-focus fluorescent emissions are blocked and only in-focus fluorescent emissions are allowed to pass through for processing.

Figure 3A:
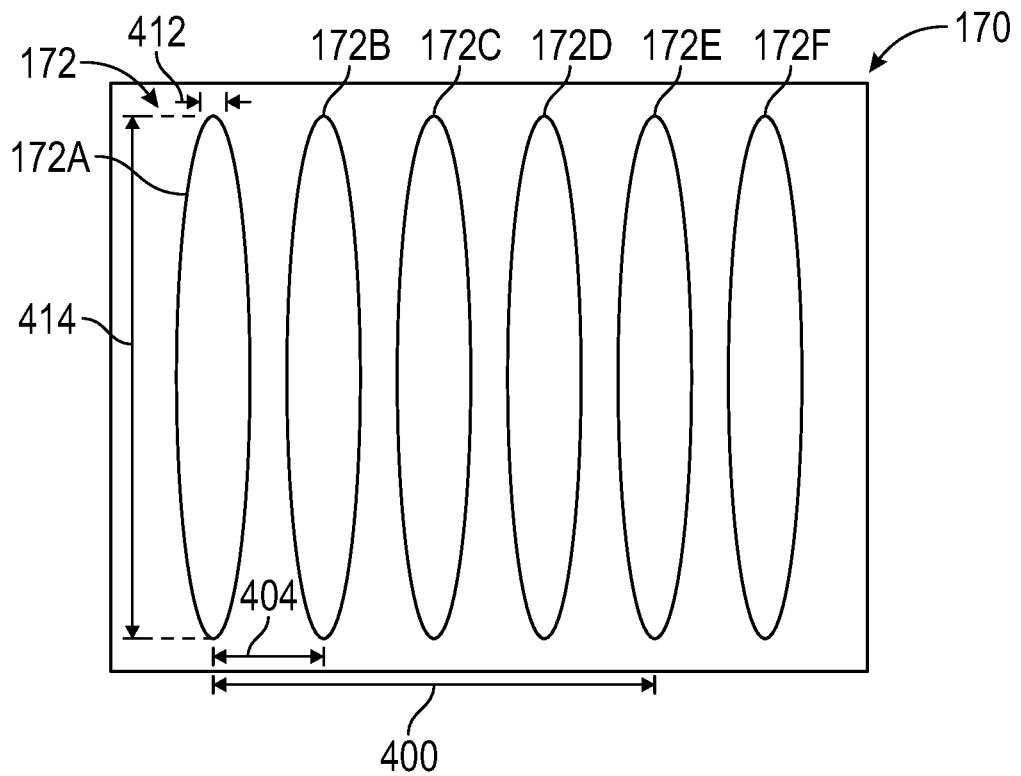
FIGS. 3A-3C illustrate examples of various vertical line scan patterns generated by the line-scanning microscopy systems.

As shown in FIGS. 1 and 3A, one example of a vertical line scanning pattern 170 is shown in which the line illumination is swept across the sample 134 and the fluorescence recorded on a camera 148 wherein the direction of the scan is in the horizontal direction 400 (e.g., left-to-right or right-to-left directions). For example, FIG. 3A shows a conventional line scanning pattern 170 that is generated through one or more vertical line scans 172 wherein the vertical line scans 172 having an identical width 412 and length 414 arranged in a vertical orientation in which each of the vertical line scans 172 is separated from an adjacent line scan 172 by an identical distance 404.

Figure 4A:
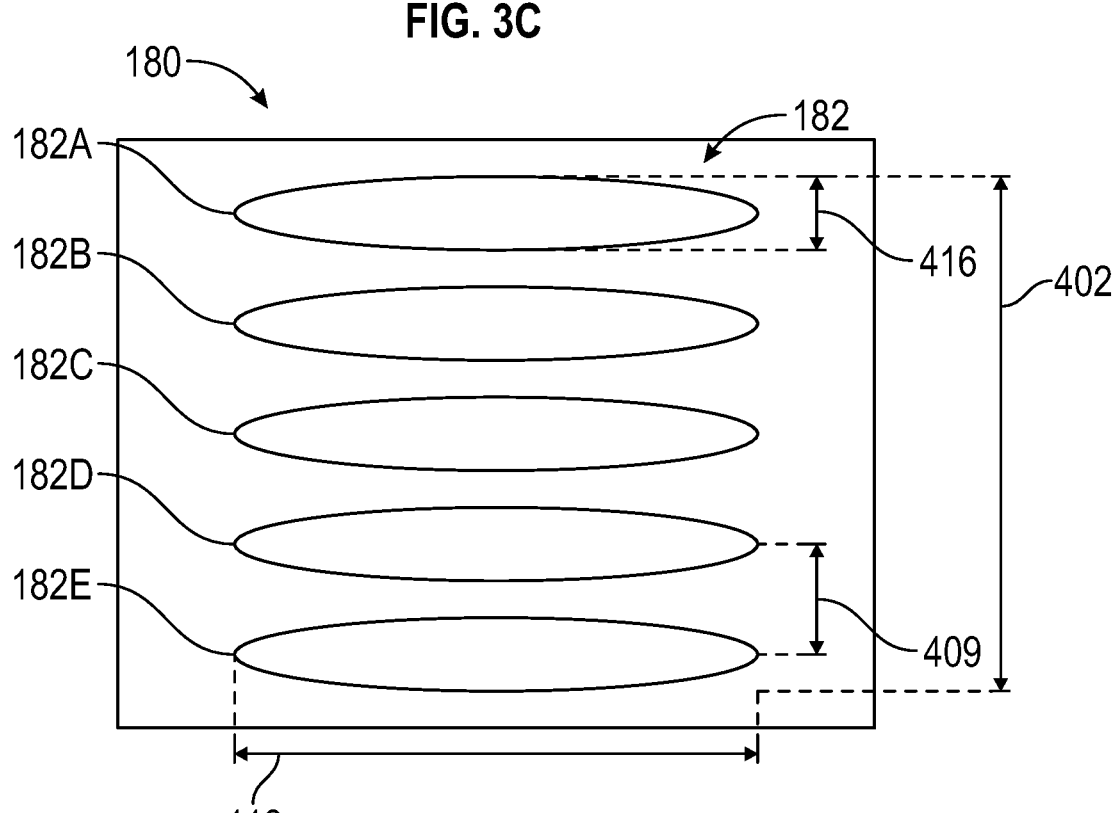
FIGS. 4A-4C illustrate examples of various horizontal line scan patterns generated by the line-scanning microscopy systems.

As shown in FIGS. 1 and 4A, one example of a horizontal line scanning pattern 180 is shown in which the line illumination is swept across the sample 134 and the fluorescence recorded on the camera 148 wherein the direction of the scan is in a vertical direction 402 (e.g., top-to-bottom or bottom-to-top directions). Similar to the vertical line scans 172, horizontal line scans 182 have an identical width 416 as width 412 and an identical length 418 as length 414 of the vertical line scanning pattern 170, but arranged in a horizontal orientation in which each of the horizontal line scans 182 is separated from an adjacent line scan 182 by an identical distance 409.

Figure 2:
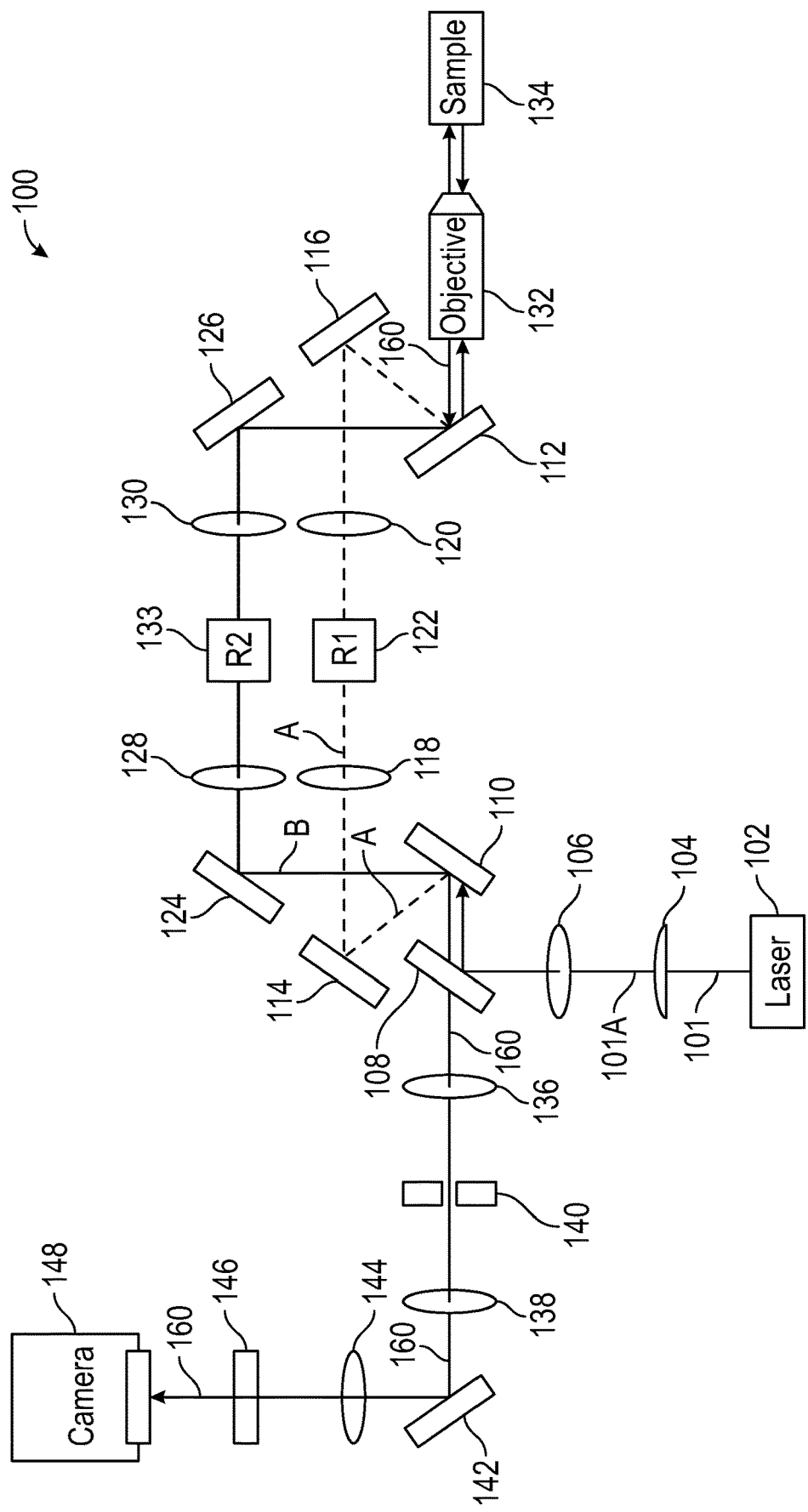
FIG. 2 is a simplified illustration showing one embodiment of a line-scanning confocal microscopy system illustrating first and second pathways that permit line scanning in vertical and horizontal orientations, respectively, that utilizes resolution enhancement technique of FIG. 1.

In one arrangement, the sample 134 shown in FIG. 2 may be alternatively illuminated by vertical and horizontal line scanning patterns 170 and 180 to produce a complete vertical and horizontal line scan illumination of the sample 134 along vertical and horizontal orientations.

Figure 3B:
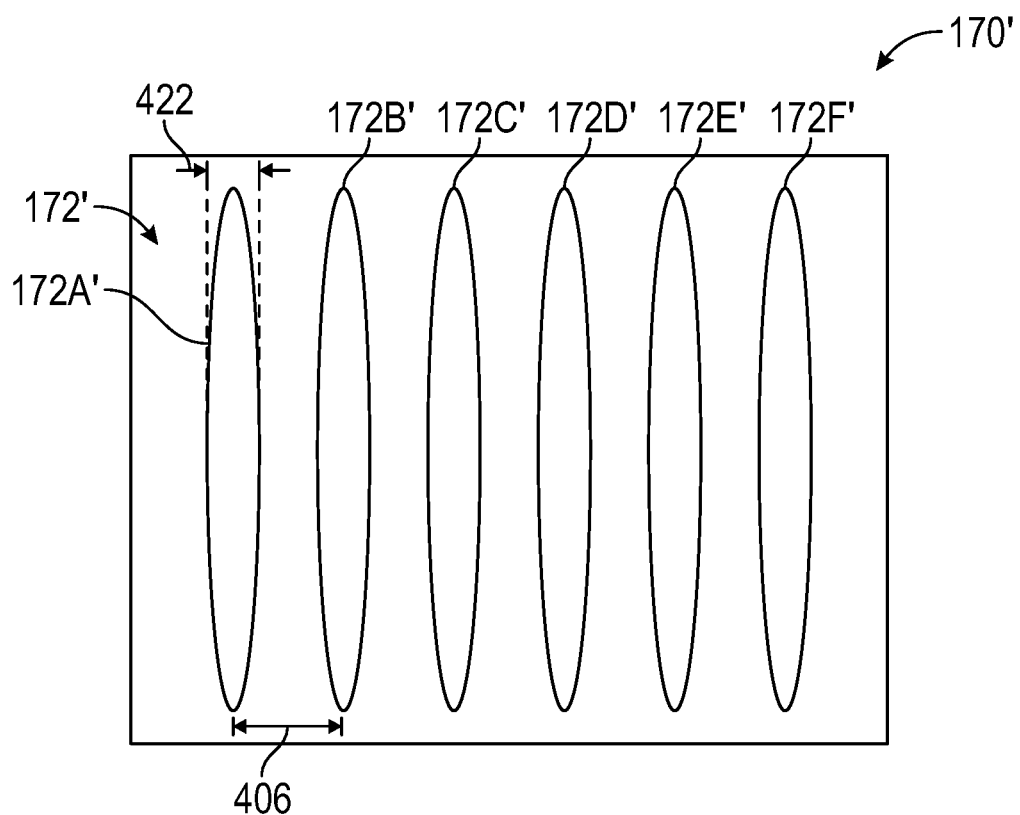

Referring back to FIG. 1, in some embodiments the in-focus fluorescent emissions generated by each vertical and horizontal line scanning pattern 170 and 180 (FIGS. 3A and 4A) may then be scaled using a scaling operation 160 that locally contracts each of the one or more fluorescent line emissions by a predetermined factor. In one embodiment of the scaling operation 160, a local contraction occurs of the fluorescent vertical and horizontal line scans 172 and 182 generated in respective vertical or horizontal line scanning patterns 170 and 180. For example, as shown in FIGS. 3A and 3B, the local contraction of adjacent fluorescent vertical line scans 172, such as 172A and 172B, to adjacent contracted fluorescent vertical line scans 172A' and 172B', respectively, (FIG. 3B) is such that the distance 404 between the geometric centers of adjacent fluorescent vertical line scans 172A and 172B is the same as the distance 406 between the geometric centers of respective adjacent scaled fluorescent vertical line scans 172A' and 172B' regardless of the degree of scaling applied to the vertical line-scanning pattern 170 to generate contracted vertical line-scanning pattern 170'. In addition, the scaling operation 160 contracts the fluorescent vertical line scans 172 locally from a first width 412 (FIG. 3A) to respective contracted fluorescent vertical line scans 172' having a second width 422 (FIG. 3B) less than the first width 412 of the fluorescent vertical line scans 172, while keeping the distance 406 between each of the adjacent contracted fluorescent vertical line scans 172A' and 172B' in the contracted vertical line-scanning pattern 170', the same as the distance 404 between adjacent fluorescent vertical line scans 172A and 172B in vertical line-scanning pattern 170.

Figure 4B:
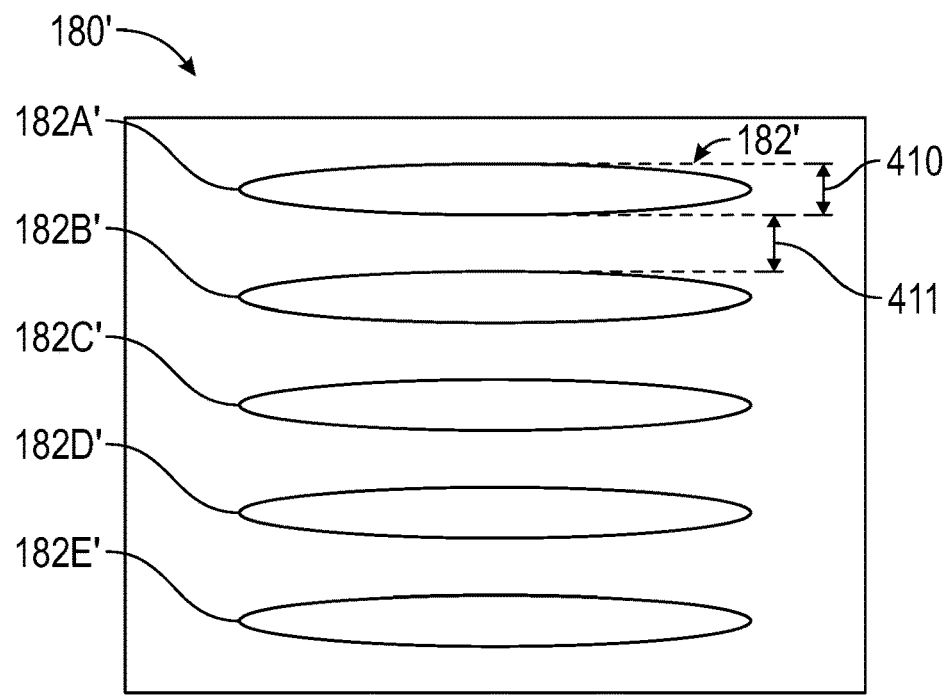

Similarly, as shown in FIGS. 4A and 4B the local contraction of adjacent fluorescent horizontal line scans 182, such as 182A and 182B, to adjacent contracted fluorescent horizontal line scans 182A' and 182B', respectively, is such that the distance 409 (FIG. 4A) between the geometric centers of the adjacent fluorescent horizontal line scans 182A and 182B is the same as the distance 411 (FIG. 4B) between the geometric centers adjacent contracted fluorescent horizontal line scans 182A' and 182B' regardless of the degree of scaling applied to the horizontal line-scanning pattern 180 to generate contracted horizontal line-scanning pattern 180'. In addition, the scaling operation 160 also contracts the fluorescent horizontal line scans 182 locally from a first width 416 (FIG. 4A) to respective contracted fluorescent horizontal line scans 182' having a second width 410 (FIG. 4B) less than the first width 416 of the fluorescent horizontal line scans 182, while keeping the distance 411 between each of the adjacent contracted fluorescent horizontal line scans 182A' and 182B' in contracted horizontal line-scanning pattern 182', the same as the distance 409 between adjacent fluorescent vertical line scans 182A and 182B in vertical line-scanning pattern 180.

Figure 3C:
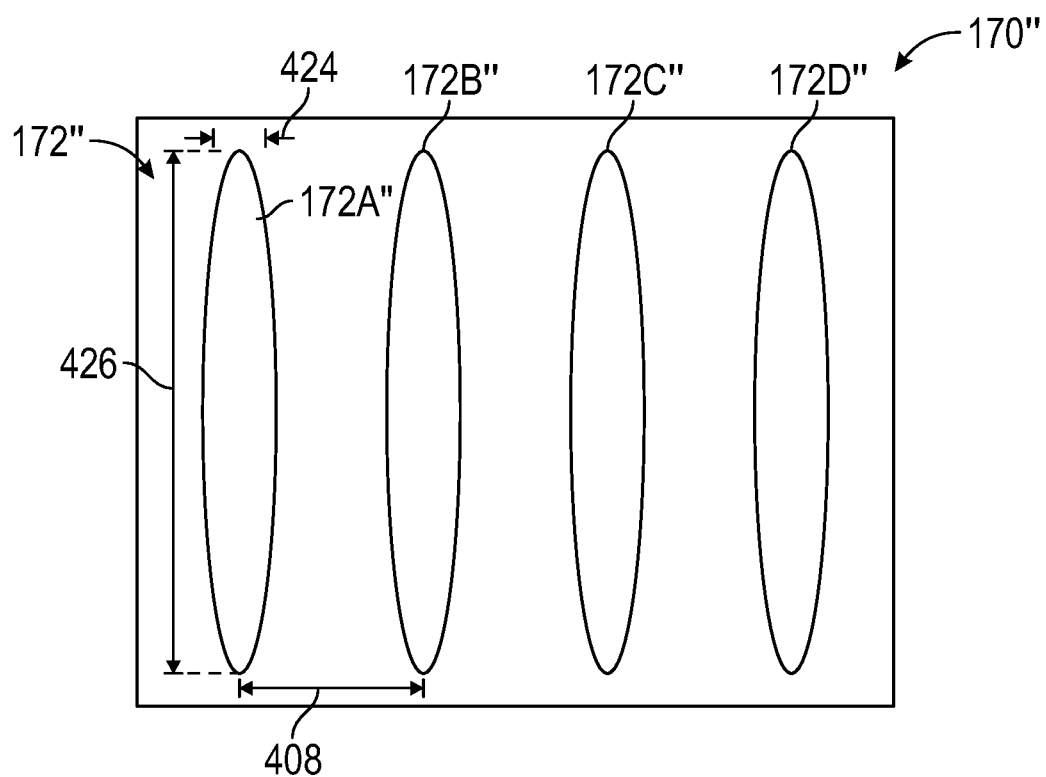
Figure 4C:
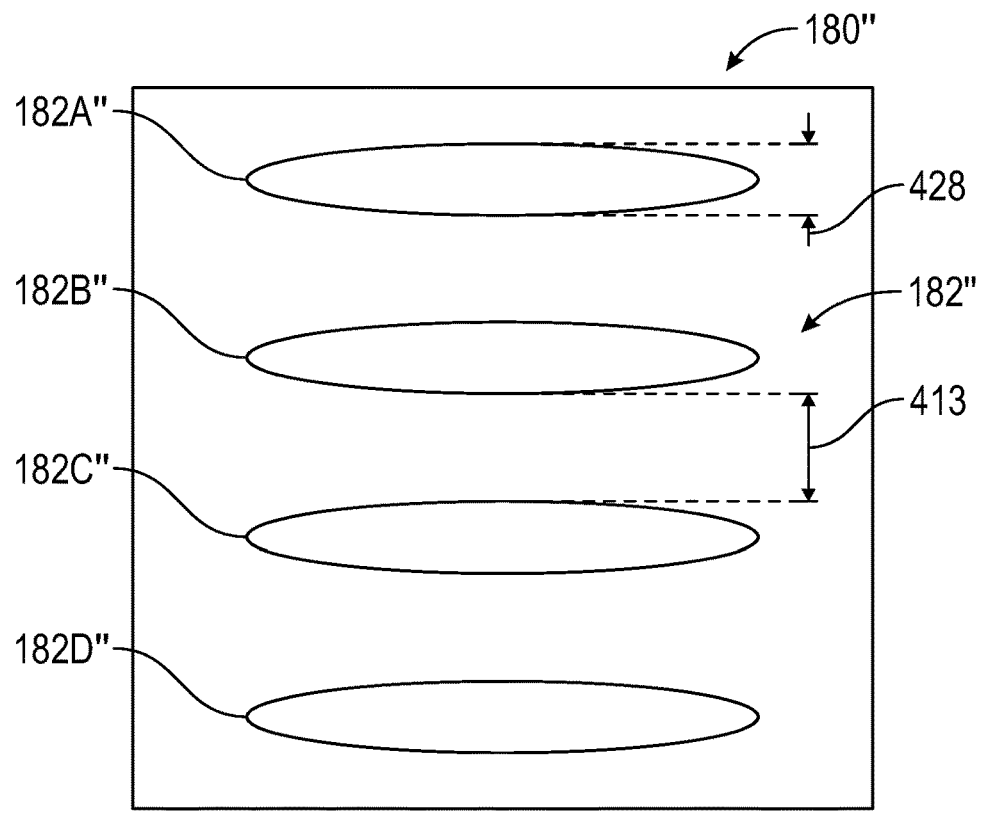

In some embodiments, the in-focus fluorescent emissions generated by each vertical or horizontal line-scanning pattern 170 and 180 may be scaled using a scaling operation 160 that locally expands, rather than locally contracts, each of the fluorescent emissions by a predetermined factor as shown in FIGS. 3C and 4C. In one embodiment of the scaling operation 160, a local expansion of the fluorescent vertical line scans 172 (FIG. 3A) and horizontal line scans 182 (FIG. 4A) to expanded fluorescent vertical line scans 172" (FIG. 3C) and expanded fluorescent horizontal line scans 182" (FIG. 4C) having respective widths 424 and 428 that are the same as respective widths 412 and 416 of vertical and horizontal line scans 172 and 182 (i.e., the width of the lines is unchanged), while the distance 408 and 413 between adjacent expanded vertical and horizontal line scans 172" and 182" is greater than the respective distance of identical distances 409 and 412 of vertical and horizontal line scans 172 and 182.

After the scaling operation 160, the scaled in-focus fluorescent emissions for each contracted vertical and horizontal line-scanning patterns 170' and 180' are then rastered in a respective rescanning operation 162 that allows the in-focus contracted fluorescent line scans 172' and 182' generated by each respective contracted vertical and horizontal line-scanning pattern 170' and 180' to be collected by a camera 148 (FIG. 2) and summed to produce a composite high resolution image in a collection and summing operation 164. In one aspect, the rescanning operation 162 may establish that the width of the contracted vertical and horizontal line scans 172' and 182' remains unchanged relative to vertical and horizontal line scans 172 and 182, but the distance between each adjacent in-focus contracted vertical and horizontal line scans 172' and 182' is increased. As such, the scaling operation 160 may not have to be required by the line-scanning confocal microscopy system 100 when such a rescanning operation 160 is implemented.

Similarly, the scaled in-focus fluorescent emissions for each expanded vertical and horizontal line-scanning patterns 170" and 180" are also rastered in a rescanning operation 162 that allows the expanded, in-focus expanded fluorescent line scans 172" and 182" to be collected by camera 148 and summed to produce a composite high resolution image in the collection and summing operation 164.

Referring back to FIG. 1, in some embodiments after the collection and summing operation 164 the composite image may undergo a deconvolution operation 166 that performs a level of de-blurring that further enhances the resolution of the composite image. The deconvolution operation 166 may be any conventional deconvolution operation 166, such as the freely available Piotyr Wendykier's Parallel Iterative Deconvolution Plugin, or the commonly used Richardson-Lucy deconvolution algorithm.

Referring to FIG. 2, one optical arrangement for a line-scanning confocal microscopy system 100 that utilizes the resolution enhancement technique is shown. The line-scanning confocal microscopy system 100 may include an illumination source 102, for example a laser, for generating a single light beam 101 that is transmitted through a cylindrical lens 104 in order to produce a line focus 101A, which is positioned at the back focal plane of a first lens 106 before the line focus 101A is redirected by a dichroic mirror 108 to a scanning apparatus 110, such as a galvanometer, to perform the line-scanning operation 152. During the line-scanning operation 152, the first scanning apparatus 110 images the line focus 101A onto the back focal plane of an imaging objective 132 through either a first pathway A or a second pathway B depending on whether the scanning apparatus 110 is generating a vertical line scanning pattern 170 or a horizontal line scanning pattern 180.

When the first pathway A is used, the scanning apparatus 110 scans the sample 134 through vertical line scans 172 made in a horizontal direction 400 that produce a vertical line scanning pattern 170 illustrated in FIG. 3A. In contrast, when the second pathway B is used, the scanning apparatus 110 scans the sample 134 through horizontal line scans 182 along a vertical direction 402 that produce a horizontal line scanning pattern 180 illustrated in FIG. 4A.

When the line focus 101A is scanned along first pathway A by the first scanning apparatus 110, the line focus 101A is imaged onto the back focal plane of an imaging objective 132 by a 4f telescopic lens pair comprising a second lens 118 and third lens 120 to illuminate the sample 134. A first image rotation device 122, positioned between the second and third lenses 118 and 120, rotates the first pathway A relative to the second pathway B. In some embodiments, a first mirror 114 is provided to redirect the line focus 101A from the first scanning apparatus 110 through the arrangement of the second lens 118, first rotating device 122 and third lens 120 and onto a second mirror 116 such that the second scanning apparatus 112 can redirect the line focus 101A from the second mirror 116 and through the imaging objective 132 to illuminate the sample 134.

Similarly, when the line focus 101A is scanned along second pathway B by the first scanning apparatus 110, the line focus 101A is also imaged onto the back focal plane of the imaging objective 132 by a 4f telescopic pair comprising a fourth lens 128 and a fifth lens 130 to illuminate sample 134. A second image rotation device 133, positioned between the fourth and fifth lenses 128 and 130, rotates the second pathway B relative to the first pathway A. In some embodiments, a third mirror 124 is provided to redirect the line focus 101A from the scanning apparatus 110 through the arrangement of the fourth lens 128, second image rotating device 133, and fifth lens 130 and onto a fourth mirror 126 such that the second scanning apparatus 112 can redirect line focus 101A from the fourth mirror 126 and through the imaging objective 132 when illuminating the sample 134.

The second scanning apparatus 112 services to select the excitation output from either first pathway A (vertical orientation) or second pathway B (horizontal orientation) and then direct the line focus 101A through the imaging objective 132 to illuminate and excite the sample 134. The resulting fluorescence from the illuminated sample 134 may be collected in an epi-configuration along the same first pathway A or second pathway B.

In response to the sample 134 being illuminated by the line-scanning pattern 170 or horizontal line-scanning pattern 180 of the single light beam 101, the sample 134 emits fluorescent line emissions 160 caused by the vertical and horizontal line-scanning patterns 170 and 180. For example, the fluorescent line emissions 160 for each vertical line-scanning pattern 170 and horizontal line-scanning pattern 180 emitted by the illuminated sample 134 are then captured through the objective lens 132, and passed back onto the second scanning apparatus 112, for example a galvanometer, which de-scans each of the plurality of fluorescent line emissions 160 by redirecting the fluorescent line emissions 160 back through either the first pathway A (e.g., when the sample 134 is being scanned in a horizontal direction) or the second pathway B (e.g., when the sample 134 is being scanned in a vertical direction). In this arrangement, the fluorescent line emissions 160 are redirected from the scanning apparatus 112 onto the second mirror 116, which redirects the fluorescent line emissions 160 through fourth lens 120, image rotation device 122, and second lens 118 before being relayed by the first mirror 114 to the first scanning apparatus 110 for de-scanning of the fluorescent line emissions 160. The first scanning apparatus 110 reflects the fluorescent line emissions 160 through the dichroic mirror 108 which then pass through a sixth lens 136. The sixth lens 136 is positioned one focal length away from the first scanning apparatus 110 such that intermediate image of the sample 134 is filtered through a confocal slit 140 to reject out-of-focus light from the fluorescent line emissions 160. A seventh lens 138 and an eighth lens 144 are positioned in a 4f telescopic arrangement to image the filtered fluorescent line emissions 160 onto a camera 148 through an emission filter 144. In some embodiments, the camera 148 is a high speed camera. In addition, a third scanning device 142, such as a galvanometer, is positioned at the intermediate focal point between the seventh lens 138 and the eighth lens 144 which serves to rescan the fluorescent line emissions 160 before image collection by the camera 148. The rescanning can alter the distance between each line focus without changing the shape/size of each fluorescent line emissions 160, therefore increasing the resolution of the image collected by the camera 148.

As shown in FIGS. 3A and 3B, the rescanning amplitude of the third scanning apparatus 142 may be set to locally contract the vertical line-scanning pattern 170 and reduce the width 412 of the vertical line scans 172 to a reduced width 422 of contracted vertical line scans 172', while allowing distance 404 between each adjacent vertical line scan 172 to be equal to the distance 406 between each contracted adjacent vertical line scan 172'. Similarly, as shown in FIGS. 4A and 4B, the rescanning amplitude of the third scanning apparatus 142 may be set to also locally contract the horizontal line-scanning pattern 180 and reduce the width 416 of the horizontal line scans 182 to a reduced width 410 of the contracted horizontal line scans 182' having a width less than the width of the horizontal line scans 182, while allowing distance 409 between each adjacent horizontal line scan 182 to be equal to the distance 411 between each adjacent contracted horizontal line scan 182'.

As shown in FIGS. 3A and 3C, the rescanning amplitude of the third scanning apparatus 142 may be set to locally expand the vertical line-scanning pattern 170 and increase the distance 404 between each adjacent vertical scan line 172 of the vertical line scanning pattern 170 to an distance 408 between each adjacent scaled vertical line scan 172", while allowing the width 412 of vertical line scan 172 to remain the same and equal to the width 424 of expanded vertical line scan 172". In some embodiments, the distance 404 between each adjacent line scan 172 may be substantially doubled to a distance 408. Similarly, as shown in FIGS. 4A and 4C, the rescanning amplitude of the third scanning apparatus 142 may be set to locally expand the horizontal line scans 180 and increase the distance 409 between each adjacent horizontal scan line 182 of the horizontal line-scanning pattern 180 to an increased distance 413 between each adjacent expanded horizontal scan line 182" of the expanded horizontal line-scanning pattern 180".

Figure 5:
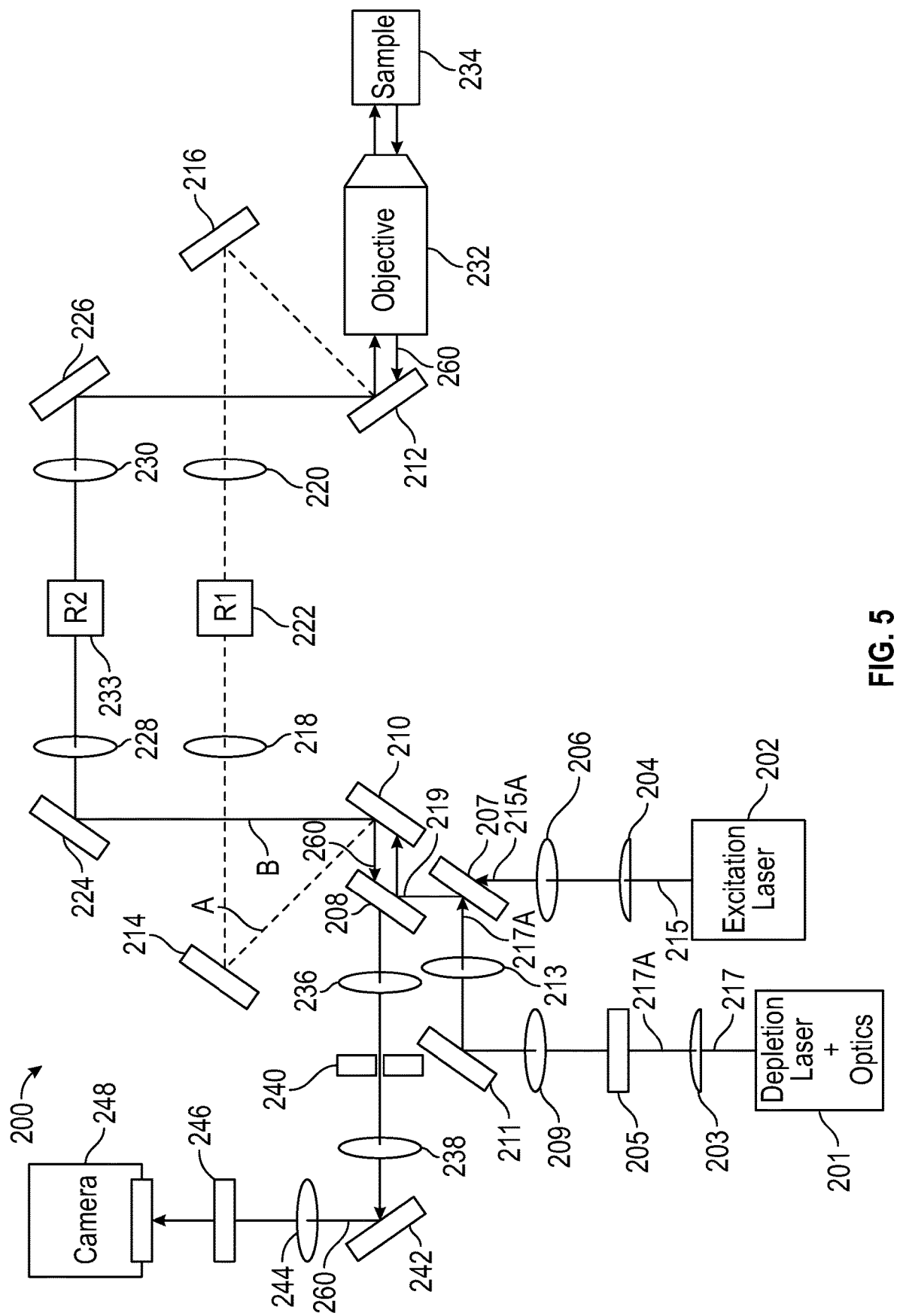
FIG. 5 is a simplified illustration showing an embodiment of a stimulated emission depletion line-scanning confocal microscopy system that utilizes the resolution enhancement technique.

Referring to FIG. 5, methods and systems for a stimulated emission depletion (STED) line-scanning microscopy system, designated 200, that utilizes the resolution enhancement technique of FIG. 1 is shown. In this embodiment, the STED line-scanning microscopy system 200 includes the same optical arrangement as the line-scanning confocal microscopy system 100 except that the STED line-scanning microscopy system 200 also includes a depletion laser source 201 with associated optics for pulse-stretching, polarization control, shuttering, and possible aberration control of a STED beam 217. The depletion laser source 201, for example a laser, generates the STED beam 217 that is transmitted through a cylindrical lens 203 to produce a STED line focus 217A, which is positioned at the back focal plane of a ninth lens 209 through a phase plate 205. The phase plate 205 creates a line-shaped "zero" in the focal plane of the STED line focus 217A transmitted through the cylindrical lens 203. In addition, the STED line-scanning microscopy system 200 includes an excitation laser source 202 for generating an excitation light beam 215 that is transmitted through a cylindrical lens 204 to produce an excitation line focus 215A, which is positioned at back focal plane of the first lens 206. The arrangement of the ninth and tenth lenses 209 and 213 mirror 211 and dichroic mirror 207 allows the excitation line focus 217A to be combined with the excitation line focus 215A to produces a combined STED/excitation line focus 219 that is redirected by the dichroic mirror 208 to a first scanning apparatus 210, such as a galvanometer, to perform the line-scanning operation 152 (FIG. 1).

During the line-scanning operation 152, the first scanning apparatus 210 images the combined STED/excitation line focus 219 onto the back focal plane of an imaging objective 232 through either a first pathway A (e.g., vertical line scanning) or a second pathway B (horizontal line scanning) depending on whether the first scanning apparatus 210 is generating a vertical line scanning pattern 170 or a horizontal line-scanning pattern 180. Similar to the line-scanning confocal microscopy system 100, when the first pathway A is used, the scanning apparatus 210 scans the sample 234 through vertical line scans 172 in a horizontal direction 400 that collectively produce either the contracted vertical line-scanning pattern 170' illustrated in FIG. 3B or the expanded vertical line-scanning pattern 170" illustrated in FIG. 3C. Similarly, when the second pathway B is used, the first scanning apparatus 210 scans the sample 234 in a vertical direction 402 that collectively produces either the contracted horizontal line-scanning pattern 180' shown in FIG. 4B or the expanded horizontal line-scanning pattern 180" shown in FIG. 4C.

When the combined STED line focus 219 is scanned along first pathway A by the first scanning apparatus 210, the combined STED line focus 219 is imaged onto the back focal plane of an imaging objective 232 by a 4f telescopic lens pair comprising a second lens 218 and third lens 220 to illuminate the sample 234. A first image rotation device 222, positioned between the second and third lenses 218 and 220, rotates the first pathway A relative to the second pathway B. In some embodiments, a first mirror 214 is provided to redirect the combined STED line focus 219 from the first scanning apparatus 210 through the arrangement of the second lens 218, first rotating device 222 and third lens 220 and onto a second mirror 216 such that the second scanning apparatus 212 can redirect the combined STED/excitation line focus 219 from the second mirror 216 and through the imaging objective 232 when illuminating the sample 234.

Similarly, when the combined STED/excitation line focus 219 is scanned along second pathway B by the first scanning apparatus 210, the combined STED/excitation line focus 219 is also imaged onto the back focal plane of the imaging objective 232 by a 4f telescopic pair comprising a fourth lens 228 and a fifth lens 230 to illuminate sample 234. A second image rotation device 233, positioned between the fourth and fifth lenses 228 and 230, rotates the second pathway B relative to the first pathway A. In some embodiments, a third mirror 224 is provided to redirect the combined STED/excitation line focus 219 from the scanning apparatus 210 through the arrangement of the fourth lens 228, second rotating device 233, and fifth lens 230 and onto a fourth mirror 226 such that the second scanning apparatus 212 can redirect the combined STED/excitation line focus 219 through the imaging objective 232 when illuminating the sample 234.

The second scanning apparatus 212 serves to select the excitation output from either first pathway A or second pathway B and then direct the combined STED/excitation line focus 219 through the imaging objective 232 to illuminate and excite the sample 234. The resulting fluorescence from the sample 234 may be collected in an epi-configuration along the same first pathway A or second pathway B.

As noted above, in response to the sample 234 being illuminated by the line scanning pattern 170 or line scanning pattern 180 of the combined STED/excitation line focus 219, the sample 234 emits fluorescent line emissions 260 caused by the line-scanning patterns 170 and 180. The fluorescent line emissions 260 emitted by the illuminated sample 234 are then captured through the objective lens 232, and passed back onto the second scanning apparatus 212, which de-scans each of the plurality of fluorescent line emissions 260 by redirecting the fluorescent line emissions 260 back through either the first pathway A (e.g., when the sample 234 is being scanned in a horizontal direction) or the second pathway B (e.g., when the sample 234 is being scanned in a vertical direction). In this arrangement, the fluorescent line emissions 260 are redirected from the scanning apparatus 212 onto a second mirror 216, which redirects the fluorescent line emissions 260 through fourth lens 220, image rotation device 222, and second lens 218 before being directed by the first mirror 214 to the first scanning apparatus 210 for de-scanning of the fluorescent line emissions 260. The first scanning apparatus 210 reflects the fluorescent line emissions 260 through the dichroic mirror 208 which pass through a sixth lens 236. The sixth lens 236 is positioned one focal length away from the first scanning apparatus 210 such that intermediate image of the sample 234 is filtered through a confocal slit 240 to reject out-of-focus light from the fluorescent line emissions 260. A seventh lens 238 and an eighth lens 244 are positioned in a 4f telescopic arrangement to image the filtered fluorescent line emissions 260 onto a camera 248 through an emission filter 246. In some embodiments, the camera 248 is a high speed camera. In addition, a third scanning apparatus 242, such as a galvanometer, is positioned at the intermediate focal point between the seventh lens 238 and the eighth lens 244 which serves to rescan the fluorescent line emissions 260 before image collection by the camera 248.

As shown in FIGS. 3A and 3B, the rescanning amplitude of the third scanning apparatus 242 (FIG. 5) may be set to locally contract the vertical line-scanning pattern 170 and reduce the width 412 of the vertical line scans 172 to a reduced width 422 of the contracted vertical line scans 172', while allowing distance 404 between each adjacent vertical line scan 172 to be equal to the distance 406 between each adjacent contracted vertical line scan 172'. Similarly, as shown in FIGS. 4A and 4B, the rescanning amplitude of the third scanning apparatus 242 may be set to also locally contract the horizontal line-scanning pattern 180 and reduce the width 416 of the horizontal line scans 182 to a reduced width 410 of the contracted horizontal line scans 182' having a width less than the width of the horizontal line scans 182, while allowing distance 404 between each adjacent horizontal line scan 182 to be equal to the distance 406 between each adjacent contracted horizontal line scan 182'.

As shown in FIGS. 3A and 3C, the rescanning amplitude of the third scanning apparatus 242 may be set to locally expand the vertical line-scanning pattern 170 and increase the distance 404 between each respective vertical scan line 172 of the vertical line scanning pattern 170 to an increased distance 408 between each adjacent expanded vertical scan line 172" of vertical expanded line-scanning pattern 170", while allowing the width 412 of each vertical line scan 172 to remain the same and equal to the width 424 of the expanded vertical line scan 172". In some embodiments, the increased distance 404 may be doubled or more than doubled relative to distance 408. Similarly, as shown in FIGS. 4A and 4C, the rescanning amplitude of the third scanning apparatus 242 may be set to locally expand the horizontal line-scanning pattern 180 and increase the distance 409 between each adjacent horizontal scan line 182 of the horizontal line-scanning pattern 180 to an increased distance 413 between each adjacent expanded horizontal scan line 182" of the expanded horizontal line-scanning pattern 180".

Figure 6:
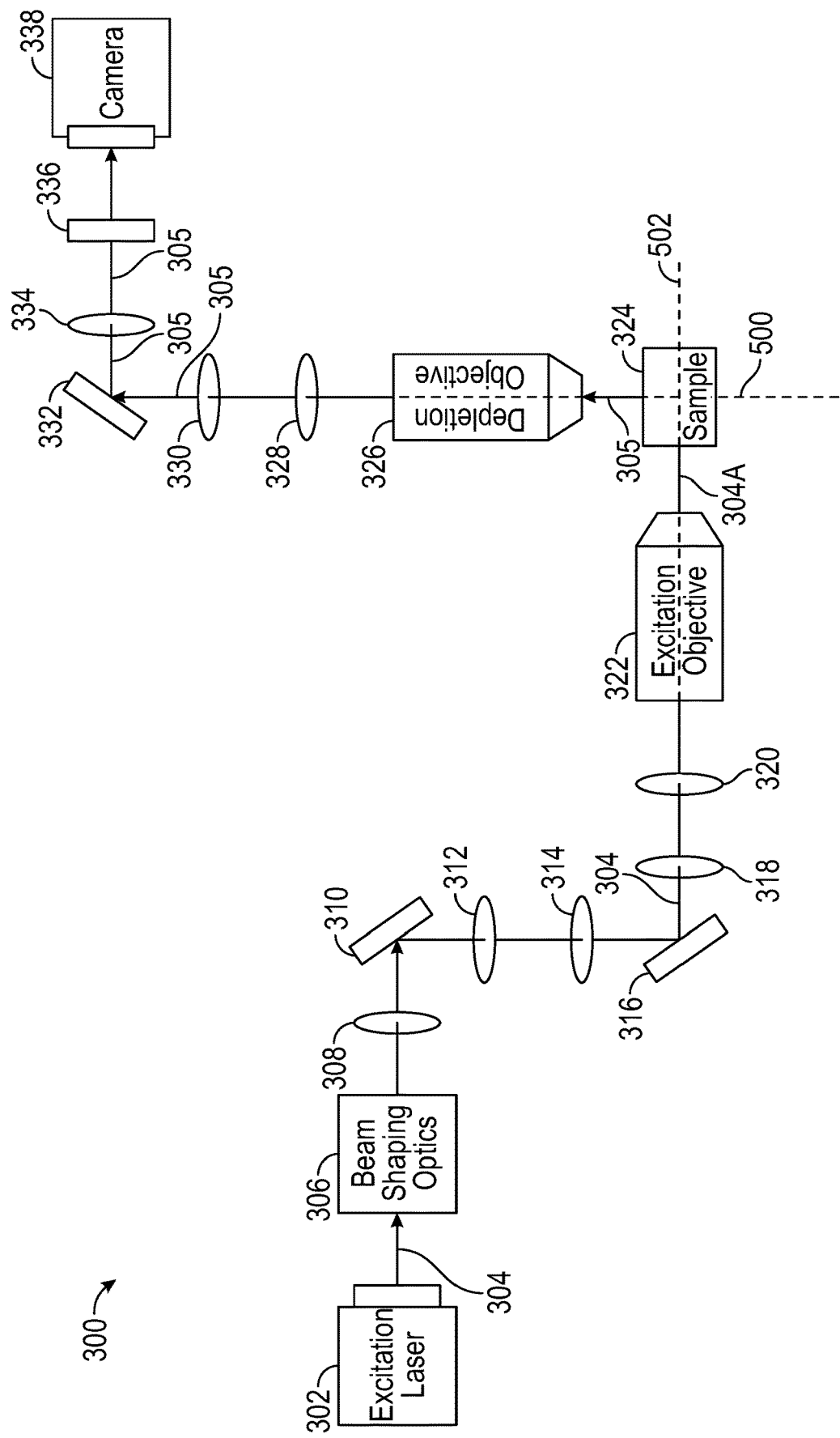
FIG. 6 is a simplified illustration showing an embodiment of a line-excitation based light sheet microscopy system that utilizes the resolution enhancement technique.

Referring to FIG. 6, a selective plane illumination microscopy (SPIM) system, designated 300, that utilizes the resolution enhancement technique of FIG. 1 is illustrated. In this embodiment, the SPIM system 300 includes an excitation laser source 302 that generates a light beam 304 that is shaped into a line beam by a beam-shaping optics arrangement 306. In some embodiments, the beam-shaping optics arrangement may include an axicon, annular aperture, cylindrical lens, or other line-forming optics. The single light beam 304 is passed through a first lens 308 and onto a first scanning apparatus 310, for example a galvanometer, in which the single light beam 304 is then relayed to a second scanning apparatus 316 through a 4f telescopic arrangement of second and third lenses 312 and 314. The second scanning apparatus 316 relays the single laser beam 304 to the back focal plane of an excitation objective 322 through another 4f telescopic arrangement of fourth and fifth lenses 318 and 320.

Rotation of the first and scanning apparatuses 310 and 316 scans the single light beam 304 along one or more scan lines to generate a light sheet 304A for defining an imaging volume in the excited sample 324. The resulting excitation or fluorescent light sheet 305 is imaged by a detection objective 326 having a vertical axis 500 that is in perpendicular relation to a horizontal axis 502 of the excitation objective 322. The back focal plane of the detection objective 326 is relayed to a third scanning apparatus 332 through another 4f telescopic arrangement of sixth and seventh lenses 328 and 330. The third scanning apparatus 332 scales the fluorescence produced by the excitation light sheet 305 to either locally contract or expand the resultant excitation light sheet 305 in the resolution enhancement technique discussed above. In some embodiments, a tube lens 334 is positioned one focal length from the third scanning apparatus 332 to allow the camera 338 to generate super-resolution images and an emission filter 336 may be used to reject excitation light. In some embodiments, the camera 338 may be opened to allow one camera exposure for one sweep of a scan line.

In some embodiments, additional optics, such as mirrors, relay lenses may be used in various optical arrangements to implement the resolution enhancement technique.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:
1. A line scanning microscopy system comprising:
a light source for transmitting a single light beam;
a scanning apparatus arrangement for relaying the single light beam along either a first pathway for generating line scans that form a vertical line-scan pattern or a second pathway for generating line scans that form a horizontal line-scan pattern;
an optic arrangement for relaying the line scans of the vertical line-scan pattern or line scans of the horizontal line-scan pattern to illuminate a sample and generate fluorescent line scan emissions formed in either the vertical line-scan pattern or the horizontal line-scan pattern;
- a scaling component for scaling the fluorescent line scan emissions to either locally contract each of the fluorescent line scan emissions by shortening a width of each of the fluorescent line scan emissions while maintaining a same distance between adjacent fluorescent line scan emissions to produce a contracted fluorescent line scan emissions that form a contracted line-scan pattern, or expand each of the fluorescent line-scan emissions to lengthen the distance between adjacent fluorescent line scan emissions while maintaining the same width for each fluorescent line scan emissions to produce an expanded fluorescent line scan emissions to form an expanded line-scan pattern; and
- a detection apparatus for capturing an image of the expanded line-scan pattern or the contracted line-scan pattern.

2. The microscopy system of claim 1, wherein the contracted fluorescent line scan emissions of the contracted line-scan pattern define a first width that is less than a second width defined by each of the fluorescent line scan emissions of the vertical line-scan pattern or the horizontal line-scan pattern.

3. The microscopy system of claim 1, wherein each of the contracted fluorescent line-scan emissions of the contracted line-scan pattern define a first longitudinal axis and each of the fluorescent line scan emissions of the vertical line-scan pattern or the horizontal line-scan pattern define a second longitudinal axis, and wherein the first longitudinal axis of each of the contracted fluorescent line scan emissions of the contracted line-scan pattern is spaced from an adjacent first longitudinal axis of another scaled fluorescent line scan emissions by a first distance, and wherein the second longitudinal axis of each of the fluorescent line scan emissions of the vertical line-scan pattern or horizontal line-scan pattern is spaced from an adjacent second longitudinal axis of another fluorescent longitudinal axis by a second distance, and wherein the first distance is equal to the second distance.

4. The microscopy system of claim 1, wherein each of the expanded fluorescent line scan emissions of the expanded line-scan pattern define a first width that is equal to a second width defined by each of the fluorescent line scan emissions the vertical line-scan pattern or the horizontal line-scan pattern.

5. The microscopy system of claim 1, wherein each of the expanded fluorescent line scan emissions of the expanded line-scan pattern define a first longitudinal axis and each of the fluorescent line scan emissions of the vertical line-scan pattern or the horizontal line-scan pattern define a second longitudinal axis, and wherein the first longitudinal axis of each of the expanded fluorescent line scan emissions of the expanded line-scan pattern is spaced from an adjacent first longitudinal axis of another scaled fluorescent line scan emissions by a first distance, and wherein the second longitudinal axis of each of the fluorescent line scan emissions of the vertical line-scan pattern or the horizontal line-scan pattern is spaced from an adjacent second longitudinal axis of another adjacent fluorescent line scan emissions by a second distance, wherein the first distance is greater than the second distance.

6. The microscopy system of claim 1, wherein the scaling component comprises a scanning apparatus for scanning the contracted fluorescent line scan emissions of the contracted line-scan pattern or the expanded fluorescent line scan emission expanded line-scan pattern onto the detection apparatus.

7. The microscopy system of claim 1, wherein the light source comprises a laser.

8. The microscopy system of claim 1, wherein the scanning apparatus arrangement for the first pathway comprises a first scanning apparatus that relays the single light beam to a first mirror that reflects the single light beam through a first pair of lenses to a second mirror for relaying the single light beam to a second scanning apparatus.

9. The microscopy system of claim 1, wherein the scanning apparatus arrangement for the second pathway comprises the first scanning apparatus that relays the single light beam to a third mirror that reflects the single light beam through a second pair of lenses to a fourth mirror for relaying the single light beam to a second scanning apparatus.

10. The microscopy system of claim 1, wherein the scanning apparatus arrangement comprises a first image rotation device along the first pathway and a second image rotation device along the second pathway.

11. A microscopy system comprising:
- a first light source that transmits a first single light beam and a second light source that transmits a second single light beam;
- a first optic arrangement that combines the first single light beam and the second single light beam to form a combined light beam;
- a scanning apparatus arrangement for relaying the combined light beam along either a first pathway for generating line scans that form a vertical line-scan pattern or a second pathway for generating line scans that form a horizontal line-scan pattern;
- a second optic arrangement for relaying the line scans of the vertical line-scan pattern or line scans of the horizontal line-scan pattern to illuminate a sample and generate a fluorescent line-scan emissions formed in either the vertical line-scan pattern or the horizontal line-scan pattern;
- a scaling component for scaling the fluorescent line scan emissions to either locally contract each of the fluorescent line scan emissions by shortening a width of each of the fluorescent line scan emissions while maintaining a same distance between adjacent fluorescent line scan emissions to produce a contracted fluorescent line scan emissions that form a contracted line-scan pattern, or expand each of the fluorescent line-scan emissions to lengthen the distance between adjacent fluorescent line scan emissions while maintaining the same width for each fluorescent line scan emissions to produce an expanded fluorescent line scan emissions to form an expanded line-scan pattern; and
- a detection apparatus for capturing an image of the expanded line-scan pattern or the contracted line-scan pattern.

12. The microscopy system of claim 11, wherein the first light source or the second light source comprises a depletion laser source that transmits a stimulated emission depletion beam.

13. The microscopy system of claim 12, further comprising:
- a third optic arrangement in operative association with the depletion laser source for providing pulse-stretching, polarization control and shuttering functions.

14. The microscopy system of claim 11, wherein the contracted fluorescent line scan emissions of the contracted line-scan pattern define a first width that is less than a second width defined by each of the fluorescent line scan emissions of the vertical line-scan pattern or the horizontal line-scan pattern.

15. The microscopy system of claim 11, wherein each of the contracted fluorescent line-scan emissions of the contracted line-scan pattern define a first longitudinal axis and each of the fluorescent line scan emissions of the vertical line-scan pattern or the horizontal line-scan pattern define a second longitudinal axis, and wherein the first longitudinal axis of each of the contracted fluorescent line scan emissions of the contracted line-scan pattern is spaced from an adjacent first longitudinal axis of another contracted fluorescent line scan emissions by a first distance, and wherein the second longitudinal axis of each of the fluorescent line scan emissions of the vertical line-scan pattern or horizontal line-scan pattern is spaced from an adjacent second longitudinal axis of another second longitudinal axis by a second distance, and wherein the first distance is equal to the second distance.

16. The microscopy system of claim 11, wherein each of the expanded fluorescent line scan emissions of the expanded line-scan pattern define a first width that is equal to a second width defined by each of the fluorescent line scan emissions of the vertical line-scan pattern or the horizontal line-scan pattern.

17. The microscopy system of claim 11, wherein each of the expanded fluorescent line scan emissions of the expanded line-scan pattern define a first longitudinal axis and each of the fluorescent line scan emissions of the vertical line-scan pattern or the horizontal line-scan pattern define a second longitudinal axis, and wherein the first longitudinal axis of each of the expanded fluorescent line scan emissions of the expanded line-scan pattern is spaced from an adjacent first longitudinal axis of another expanded fluorescent line scan emissions by a first distance, and wherein the second longitudinal axis of each of the fluorescent line scan emissions of the vertical line-scan pattern or the horizontal line-scan pattern is spaced from an adjacent second longitudinal axis of another adjacent fluorescent line scan emissions by a second distance, wherein the first distance is greater than the second distance.

18. A microscopy system comprising:
a light source for transmitting a single light beam;
a scanning apparatus arrangement for relaying the single light beam and generating a light sheet;
an excitation objective for imaging the light sheet onto a sample for generating fluorescence emissions;
a detection objective for relaying the fluorescence emissions through an optic arrangement:
a scaling component for scaling the fluorescence emissions received from the optic arrangement to either locally contract the fluorescence emissions arising from the light sheet by shortening a width of each of the fluorescence emissions from the light sheet while maintaining a same distance between adjacent fluorescent emissions from the light sheet to produce fluorescence emissions from the light sheet that are contracted or locally expand the fluorescence emissions arising from the light sheet by lengthening a distance between adjacent fluorescent emissions from the light sheet to produce fluorescence emissions that are expanded; and
a detection apparatus for capturing an image of the expanded or the contracted fluorescence emissions rising from the light sheet.

19. The microscopy system of claim 18, wherein the detection objective is aligned at a perpendicular relation relative to the excitation objective.

20. The microscopy system of claim 18, further comprising:
beam shaping optics positioned between the light source and the scanning apparatus arrangement for shaping the single light beam into a line beam.

* * * * *